United States Patent
Liu et al.

(10) Patent No.: US 10,235,679 B2
(45) Date of Patent: Mar. 19, 2019

(54) LEARNING A RANKER TO RANK ENTITIES WITH AUTOMATICALLY DERIVED DOMAIN-SPECIFIC PREFERENCES

(75) Inventors: Chao Liu, Bellevue, WA (US); Yi-Min Wang, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1397 days.

(21) Appl. No.: 12/764,983

(22) Filed: Apr. 22, 2010

(65) Prior Publication Data

US 2011/0264518 A1    Oct. 27, 2011

(51) Int. Cl.
G06Q 30/02    (2012.01)
(52) U.S. Cl.
CPC ......... *G06Q 30/02* (2013.01); *G06Q 30/0251* (2013.01)
(58) Field of Classification Search
USPC ............................................ 705/14.54, 14.73
See application file for complete search history.

(56) References Cited

U.S. PATENT DOCUMENTS

| | | |
|---|---|---|
| 7,287,012 B2 | 10/2007 | Corston et al. |
| 2006/0195406 A1 | 8/2006 | Burges et al. |
| 2006/0253428 A1 | 11/2006 | Katariya et al. |
| 2007/0179949 A1 | 8/2007 | Sun et al. |
| 2008/0027925 A1 | 1/2008 | Li et al. |
| 2008/0082466 A1* | 4/2008 | Meijer ................. G06N 7/005 706/12 |
| 2008/0208836 A1 | 8/2008 | Zheng et al. |
| 2009/0006360 A1* | 1/2009 | Liao ................. G06F 17/30595 |
| 2011/0016065 A1* | 1/2011 | Chapelle ............. G06N 99/005 706/12 |

OTHER PUBLICATIONS

"A Meta-Learning Approach for Robust Rank Learning", by Carvalho et al. Language Technologies Institute. Carnegie Mellon University. pp. 1-9. 2008. (Year: 2008).*

"Learning to Rank", Retrieved at << http://homepage.mac.com/corinnacortes/papers/proceedings-nips05workshop-ranking.pdf >>, Editor: Shivani Agarwal, Corinna Cortes and Ralf Herbrich, Proceedings of the NIPS 2005 Workshop, Dec. 9, 2005, pp. 1-44.

(Continued)

*Primary Examiner* — William A Brandenburg
(74) *Attorney, Agent, or Firm* — Medley, Behrens & Lewis, LLC

(57) ABSTRACT

A system is described herein that includes a preference deriver component that receives a predefined preference rule that indicates a hierarchy pertaining to entities belonging to a domain, wherein each of the entities has attributes and values for such attributes corresponding thereto, and wherein the preference deriver component outputs preferences between various subsets of entities based at least in part upon the preference rule. The system also includes a learning component that learns a computer-implemented ranker component that is configured to rank the entities belonging to the domain, wherein the learning component learns the computer-implemented ranker based at least in part upon the preferences between the various subsets of the entities output by the preference deriver component.

20 Claims, 10 Drawing Sheets

(56) References Cited

OTHER PUBLICATIONS

Truong, et al., "Learning to Rank with Partially Labeled Training Data", Retrieved at << http://eprints.pascal-network.org/archive/00002637/01/Lrn2RnkwithPartLblTrndata-Inscit06.pdf >>, In International Conference on Multidisciplinary Info Sci/Tech, 2006, pp. 1-5.

Yeh, et al., "Learning to Rank for Information Retrieval Using Genetic Programming", Retrieved at << http://jenyuan.yeh.googlepages.com/jyyeh-LR4IR07.pdf >>, SIGIR workshop on learning to rank for information retrieval (LR4IR-2007), Jul. 27, 2007, pp. 1-8.

Agarwal, et al., "Learning to Rank Networked Entities", Retrieved at << http://www.cse.iitb.ac.in/~soumen/doc/netrank/netrank1.pdf >>, International Conference on Knowledge Discovery and Data Mining, Proceedings of the 12th ACM SIGKDD international conference on Knowledge discovery and data mining, Aug. 20-23, 2006, pp. 1-10.

Cheng, et al., "Entityrank: Searching Entities Directly and Holistically", Retrieved at << http://ews.uiuc.edu/~tcheng3/papers/entityrank-vldb07-cyc-jul07.pdf >>, Very Large Data Bases, Proceedings of the 33rd international conference on Very large data bases, Sep. 23-27, 2007, pp. 1-12..

\* cited by examiner

LEARNING A RANKER TO RANK ENTITIES WITH AUTOMATICALLY DERIVED DOMAIN-SPECIFIC PREFERENCES

BACKGROUND

The amount of information available on the World Wide Web has grown exponentially, and billions of items (documents, images, videos, etc.) are available to a user through utilization of a browser. Such explosive growth of web information has not only created a crucial challenge for search engine companies in connection with handling large scale data, but has also increased the difficulty for a user to manage her information needs. For instance, it may be difficult for a user to compose a succinct and precise query to represent her information need.

Instead of pushing the burden of generating succinct search queries to users, search engines have been configured to provide increasingly relevant search results, given a particular query. More particularly, conventional search engines are configured to receive a query and to compare such query with a plurality of documents. Each query/document pair can be assigned a score, and the highest-scored document with respect to the query can be provided to the user in a graphical user interface as a most relevant search result with respect to the query.

While today's search engines are relatively robust with respect to ranking web documents with respect to a query, they are not configured to rank entities that belong to a certain domain. Entity ranking is difficult in general, because different domains usually have entities that are described by different attributes, to which weights need to be assigned when performing ranking. That is, entities in different domains have quite different attributes and the weights are dependent on the attributes when entity ranking is undertaken. Many heuristics exist to rank entities in a domain, such as, for instance, ranking singers or musicians based upon their popularity as evidenced by record sales. In another example, professors can be ranked by the number of publications authored by such professors and the quality of the venues where the publications appear. Such manners of ranking entities, however, are not robust, and less accurate as it is hard to incorporate numerous attributes heuristically.

SUMMARY

The following is a brief summary of subject matter that is described in greater detail herein. This summary is not intended to be limiting as to the scope of the claims.

Described herein are various technologies pertaining to learning a domain-specific ranker that can be configured to rank entities that belong to a domain. Also described herein are various technologies for providing a ranked list of entities responsive to a user request for such ranked list. Entities can be classified as belonging to at least one domain. For example, a particular professor can be classified as belonging to a domain "professors". In another example, a particular actor can be classified belonging to the domain "actors". Thus, the domain "actors" can have several entities belonging thereto, wherein each entity can be described through utilization of a feature vector (a vector of attribute values). Attributes that can describe an actor include age, number of television shows or movies in which the actor has appeared, titles of television shows or movies in which the actor has appeared, etc. Similarly, a professor can have attributes associated therewith such as identity of a university where the professor teaches, a number of publications authored by the professor, a number of classes taught by the professor, identity of classes taught by the professor, amongst other features. Accordingly, in the context of a computer, an entity can be represented by an identifier and a feature vector, wherein the feature vector is made up of attributes that have been assigned certain values. The identity and feature vector can be in the form of machine readable data, such that a processor can access and utilize such data when performing a processing operation.

In accordance with an aspect described herein, preference data (such as preference pairs) can be automatically generated from subsets of entities belonging to a domain based at least in part upon a predefined preference rule. This predefined preference rule can reflect a known hierarchy amongst entities in the domain, which can be based upon a pre-defined categorization of entities. This preference rule, for instance, can be utilized to generate preference pairs amongst entities in the domain. In an example, in the domain "actors" a preference rule may indicate that actors who have won a certain award are preferred over actors who were nominated for the certain award but did not win, and those actors are preferred over actors who were not nominated at all. This preference rule can be applied to entities to create preference pairs, wherein a preference pair includes two entities and an indication that one of the two entities is preferred over the other. Thus, in an example preference pair, a first actor who won the certain award will be preferred over a second actor who did not win the award.

Preference data that indicates preferences amongst and between entities in a particular domain can be provided to a learning function that is configured to learn a computer implemented ranker based at least in part upon such preference data. For instance, the learning function in the ranker can ascertain which attributes are more important than other attributes by analyzing the preference data that was generated through application of the preference rule to the entities. It is to be understood that any suitable learning function that can learn a ranker based at least in part upon preference data (preference pairs) can be used and is intended to fall under the scope of the hereto-appended claims.

Once the ranker has been learned, such ranker can be utilized to assign scores to each entity in the domain of interest, regardless of whether or not an entity was included in a preference pair. For example, the ranker can be configured for utilization in a general purpose search engine, such that if the intent of the user is to obtain a ranked list of entities belonging to the domain, the search engine can provide a user with such ranked list. In another example, the learned ranker can be configured for utilization in a special purpose web site such as a retail web site, such that if a user wishes to obtain a ranked list of purchasable items that belong to a certain domain, the user can request such ranked list. Other aspects will be appreciated upon reading and understanding the attached figures and description.

DETAILED DESCRIPTION

Figure 1:
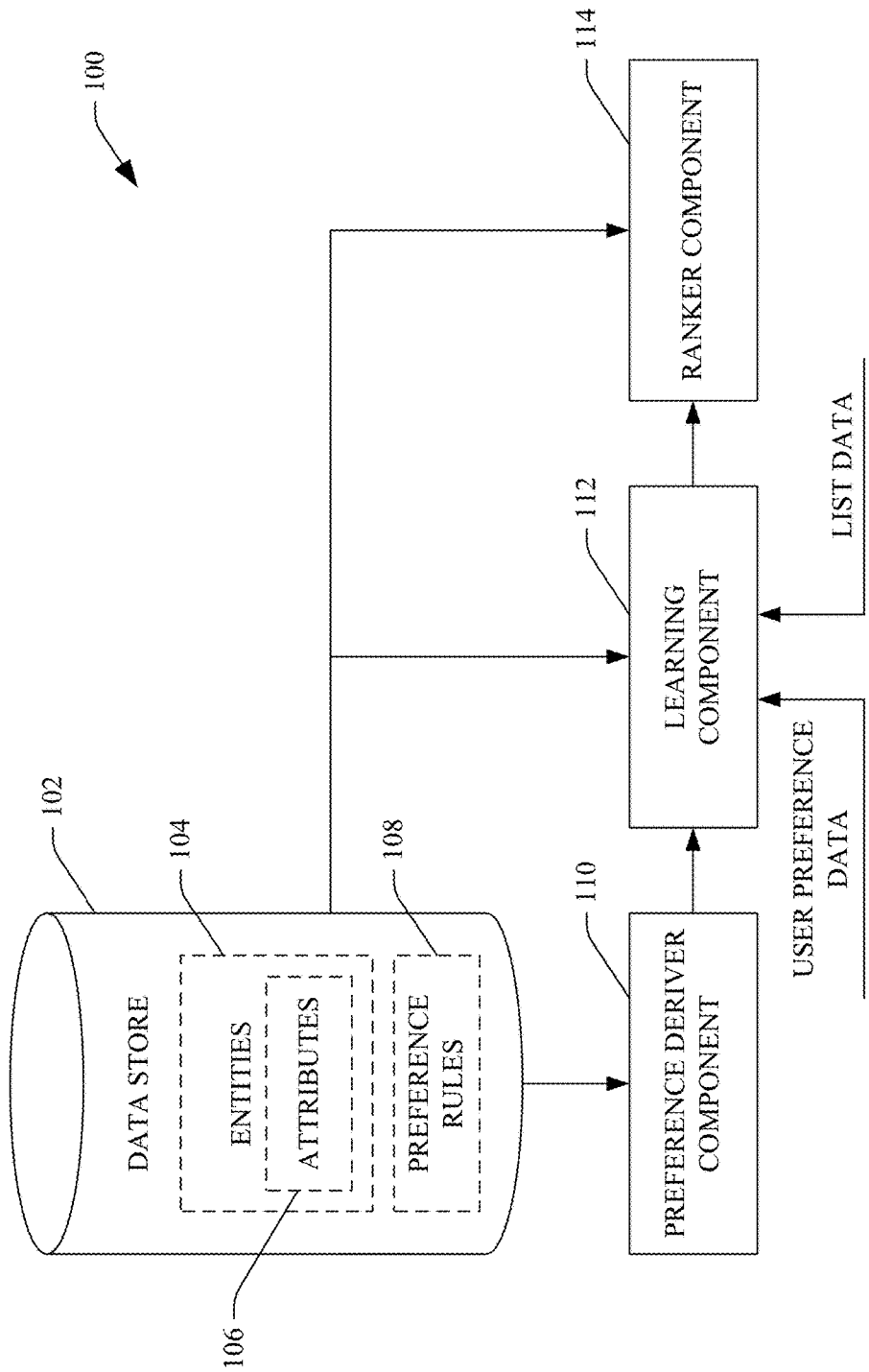
FIG. 1 is a functional block diagram of an example system that facilitates learning a domain-specific ranker.

Various technologies pertaining to learning to rank entities that belong to a certain domain will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates learning a ranker that is configured to rank entities that belong to a particular domain is illustrated. As used herein, a domain may be a particular class of entities, such that entities can belong to a domain based upon characteristics of such entities. An example domain may be "professors", and particular professors are entities within such domain. Another example domain can be "actors", wherein specific actors are entities in such domain. In still yet another example, a domain can be "digital cameras", and specific types of digital cameras can be entities in that domain. Thus, an entity can be a person, object, place, etc., and an entity may belong to a certain domain that may be used to classify the entity.

The system 100 comprises a data store 102 that includes computer readable data that can be accessed and processed by a processor of a computing device. The data store 102 comprises a plurality of computer readable entities 104, and a plurality of computer readable attributes 106 that can be utilized to represent the entities 104. For example, each entity in the entities 104 can have a plurality of attributes corresponding thereto, and such attributes can have values corresponding thereto. Accordingly, each entity can be represented by an identifier and a feature vector that includes a plurality of features/attributes. Thus, in an example, if the domain of interest is "professor", each entity in the domain may be an individual professor that can be represented by features such as classes taught, university where the professor teaches, degrees obtained by the professor, identity of publications authored by the professor, amongst other features. While the entities 104 and corresponding attributes 106 are shown as being included in the data store 102, it is to be understood that such entities 104 and attributes 106 may be distributed across numerous data stores.

The data store 102 may also comprise one or more preference rules 108 that can be utilized to ascertain preferences between particular entities in the plurality of entities 104. A preference rule can be a predefined rule that is based on a known hierarchy or a rule that is individually designed by a user. Furthermore, a preference rule may include one or more conditions pertaining to the entities. In a particular example, a preference rule may be applicable to the domain of "professors", wherein the preference rule indicates that full professors>associate professors>assistant professor|for professors in the same department of the same institutions. In this example, the hierarchy is that full professors are preferred to associate professors who are preferred to assistant professors, and the condition is that for any two professors considered they must be in the same department of the same university. In another example, in the domain "actors" a preference rule may be that actors given a certain type of award>actors nominated for the certain type of award>actors not nominated for the certain type of award-|for actors between the ages of 40-50. While the preference rules 108 are shown to reside in the data store 102 with the entities 104 and the attributes 106, it is to be understood that the preference rules 108 may be stored on a separate data repository and/or distributed across numerous data repositories.

A preference deriver component 110 can be in communication with the data store 102, can access the entities 104, the attributes, 106, and the preference rules 108, and can apply at least one preference rule to the entities 104 to output preference data. In an example, the preference deriver component 110 can output preference pairs, wherein a preference pair includes two entities with an indication that one entity is preferred over another. This preference pair can be output based at least in part upon a preference rule applied to the two entities. Thus, the preference deriver component 110 can analyze pairs of entities in the entities 104, apply one or more preference rules to such pairs of entities, and output a preference pair if the preference rule applied indicates that one entity is preferred over another. Further, the preference deriver component 110 can apply multiple preference rules to entities in a particular domain. For instance, the preference deriver component 110 can apply a first preference rule to the entities 104 in the data store 102, and output preference pairs based at least in part upon the application of such preference rule to the entities 104. The preference deriver component 110 may then utilize a second preference rule to obtain further preference data, such that the preference deriver component 110 can output preference pairs that correspond to the second preference rule.

A learning component 112 can receive the preference data output by the preference deriver component 110 and can utilize such preference data to learn a domain-specific ranker component 114. The learning component 112 can be or include any suitable computer-implemented learning function that can learn a ranker upon receipt of preference pairs. It is to be understood that the function of the learning component 112 is to assign weights to at least a subset of the attributes upon analyzing a plurality of preference pairs, such that entities can be ranked with respect to one another based upon values of attributes that describe the entities.

Thus, the learning component 112 can output a domain-specific ranker component 114 that is trained by way of automatically derived preference pairs, wherein the domain-specific ranker is configured to receive each entity in the list of entities 104 in the data store 102, assign a score to each entity, and output a ranked list of such entities based upon scores assigned to the entities 104. As will be described in greater detail below, the ranker component 114 can be configured for utilization in a general search engine, in a retail web site, or other scenario where ranking entities that belong to a particular domain may be desired.

While the learning component 112 has been described as learning the ranker component 114 by generating preference pairs through utilization of one or more preference rules, it is to be understood that the learning component 112 can learn the ranker component 114 based at least in part upon preference data received from other sources in combination with preference data received from the preference deriver component 110. For example, a user may provide some preference data pertaining to entities in a domain of interest. For instance, if the learning component 112 is configured to rank actors, a user may provide a top five list of actors, wherein the top five are the top five actors in the opinion of the user. The learning component 112 can receive such preference data from the user, and can learn a ranker component 114 based at least in part upon the combination of preference pairs output by the preference deriver component 110 and the user preference data. In this example, the user preference data can take priority over the preference pairs output by the preference deriver component 110, such that if a preference indicated in the user preference data conflicts with a preference pair output by the preference deriver component 110, then the preference data from the user can take priority. In this scenario, the learning component 112 can output the ranker component 114 such that it is personalized to the tastes of the user with respect to the domain of interest.

In another example, the learning component 112 can receive list data, which can include pre-existing ranked lists of entities in the domain, and utilize the list data as input for learning the ranker component 114. For instance, various web sites and publications provide ranked lists of entities in a domain (such as universities), wherein such ranked lists partially agree and partially disagree. Preference pairs can be derived from the lists where such lists are in agreement as to preferences between entities. For example, if each of the lists indicates that a first university is preferred over a second university, then a preference pair indicating such preference can be provided to the learning component 112, which can utilize the preference pair in connection with learning the ranker component 114. Furthermore, these lists can be weighted based at least in part upon reputation of the creator(s) of the lists and/or agreement between lists. Pursuant to an example, four different lists of entities in the domain can be considered. Three of such lists may be relatively similar, such that there is a significant amount of agreement between rankings of entities in the list. The fourth list, however, deviates a good amount from the consensus. Accordingly, the first three lists can be provided a greater weight than the fourth list when utilized by the learning component 112 to learn the ranker component 114.

Figure 2:
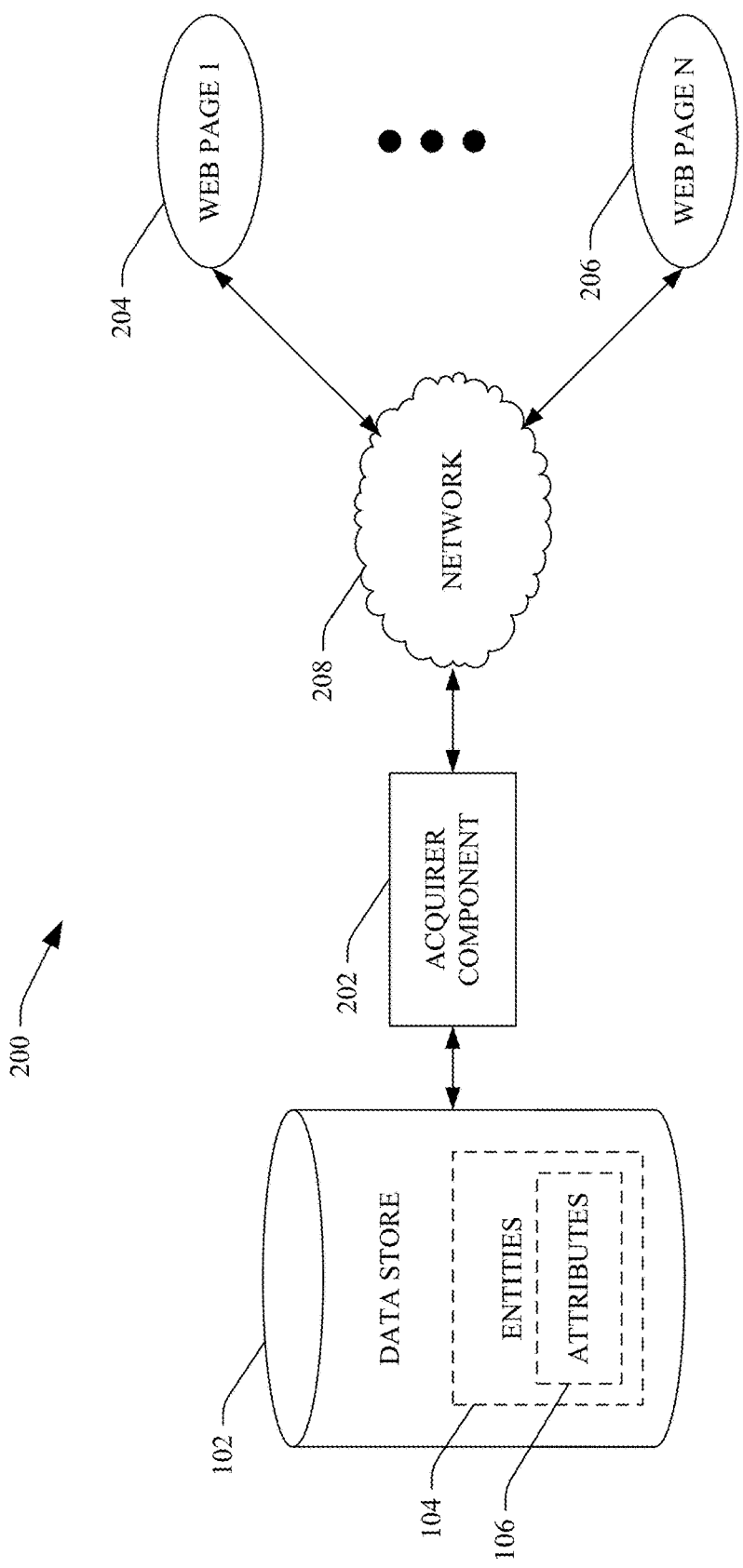
FIG. 2 is a functional block diagram of an example system that facilitates mining web sites accessible by way of the Internet for entities and attributes related thereto.

Now referring to FIG. 2, an example system 200 that facilitates acquiring the entities 104 and the corresponding attributes 106 for retention in the data store 102 is illustrated. The system 200 includes an acquirer component 202 that can access a plurality of web pages 204-206 over a network 208. For example, the acquirer component 202 may be or include a web crawler that is configured to analyze various web pages on the Internet to search for the entities 104 that belong to a domain of interest. Once the acquirer component 202 locates an entity, the acquirer component 202 can assign an identifier corresponding to the entity to be retained in the data store 102 together with attributes that describe such entity. In a particular example, a domain of interest may be "professors." Oftentimes, professors have homepages dedicated thereto. The acquirer component 202 can be configured to browse web pages of professors and to search these web pages for descriptions of professors including attributes thereof. Once the acquirer component 202 locates a web page corresponding to a particular professor, the acquirer component 202 can be configured to extract data from such web page and cause the data to be retained in the data store 102 as an entity and corresponding attributes. Other processing/searching functions to automatically or semi-automatically locate entities and attributes corresponding thereto are contemplated and intended to fall under the scope of the hereto appended claims.

Figure 3:
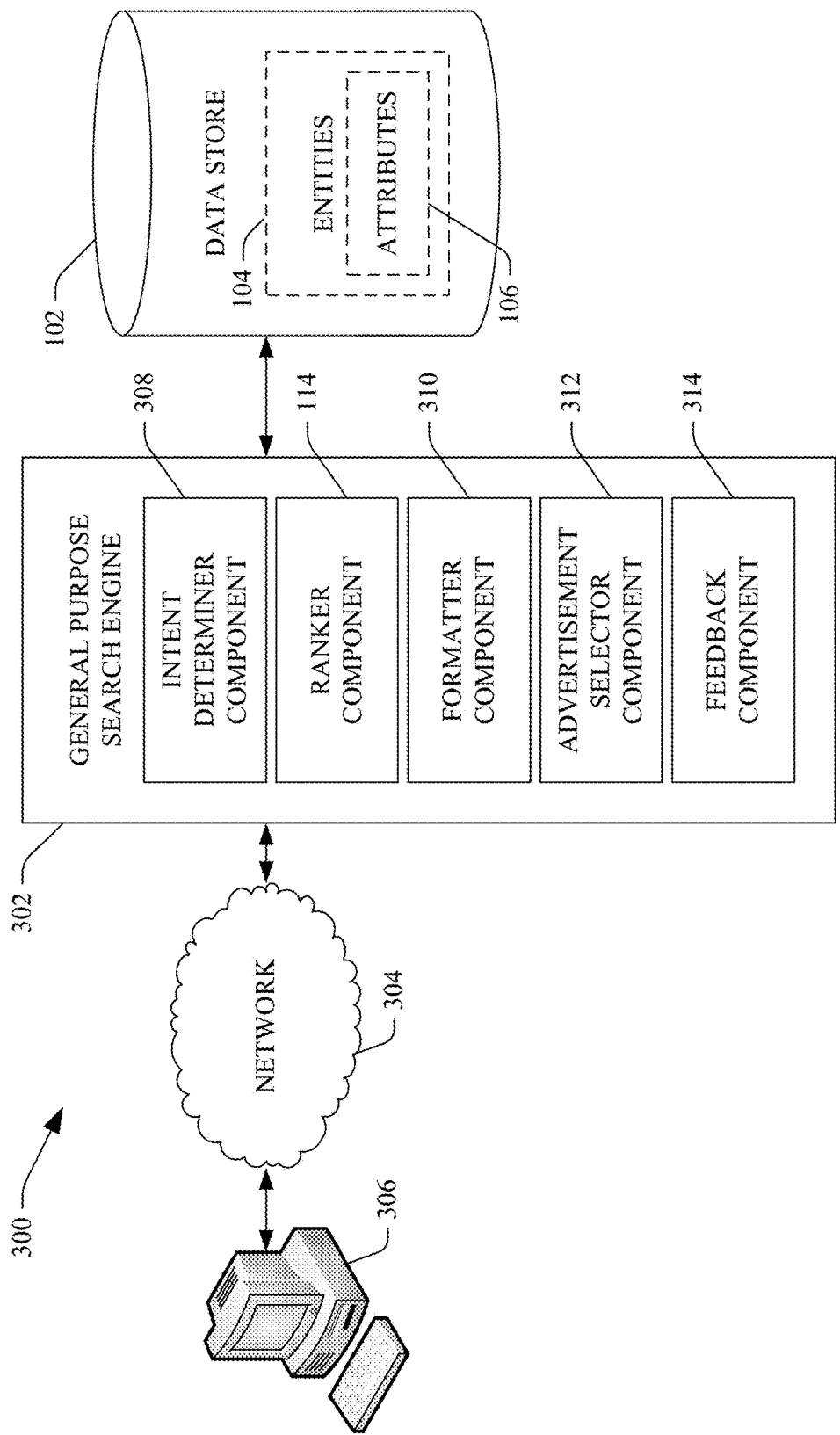
FIG. 3 is a functional block diagram of an example system that facilitates outputting a ranked list of entities upon receipt of a request for such ranked list from a user.

Referring now to FIG. 3, an example system 300 that facilitates outputting a ranked list of entities that belong to a particular domain is illustrated. The system 300 comprises a general purpose search engine 302 that is configured to receive queries from a user and return web pages, images, etc. upon receipt of a query. The general purpose search engine 302 may be executed on a server or server farm that is accessible to computing devices by way of a network 304. In particular, a user employing a client computing device 306 can utilize a web browser installed on such client computing device 306 to access the general purpose search engine 302. Specifically, the user can provide a URL to the browser executing on the client computing device 306 to direct the browser to the general purpose search engine 302. The user at the client computing device 306 may then indicate that such user wishes to receive a ranked list of entities pertaining to a particular domain.

For instance, the user can indicate that he or she wishes to receive a ranked list of entities that belong to a particular domain by selecting a certain hyperlink that is displayed on the general purpose search engine 302. For example, a selectable graphical icon/hyperlink can be displayed on the search engine, wherein the graphical icon/hyperlink indicates to the user that by selecting such hyperlink the user can be provided with ranked lists of entities pertaining to one or more domains that are selectable by the user. In another example, the user can provide a certain keyword or series of keywords to the search engine to indicate that the user wishes to receive a ranked list of entities that belong to a domain. The user can accomplish this by utilizing a certain keyword or series of keywords in a query submitted to the general purpose search engine 302, such as the keyword "rank" followed by an indication of a domain.

The general purpose search engine can include an intent determiner component 308 that can determine the intent of the user of the client computing device 306 with respect to ranking entities in the particular domain. For instance, the intent determiner component 308 can detect that the user has selected the hyperlink corresponding to a portion of the general purpose search engine 302 that is configured to output ranked lists of entities belonging to certain domains. In another example, the intent determiner component 308 can analyze contents of a query submitted by the user of the client computing device 306 and can determine based upon the content of such query that the user of the client computing device 306 wishes to receive a ranked list of entities in a particular domain.

The general purpose search engine may also comprise the ranker component 114 that is configured to rank entities that belong to the domain indicated by the user of the client computing device 306. Specifically, the ranker component 114 can access the data store 102 which comprises the entities 104 and attributes 106 that represent such entities. The ranker component 114 can receive the entities 104 that belong to a domain specified by the user of the client computing device 306 (and the corresponding attributes 106) and can output a ranked list of entities that belong to the domain. The ranker component 114 can be learned such that it is configured to rank entities for a particular domain as described above.

The general purpose search engine 302 may also include a formatter component 310 that is configured to format the ranked list of entities for suitable display on the client computing device 306. For example, the client computing device 306 may be a personal computer such that the display space of the personal computer is sufficient to allow for display of a relatively large number of entities. In another example, the client computing device 306 can be a portable device such as a mobile telephone, and the formatter component 310 can be configured to suitably display a relatively small number of entities in the ranked lists of entities on the display screen of the mobile telephone. That is, the formatter component 310 can take into consideration the type of computing device utilized by the user to access the general purpose search engine 302 when formatting a ranked list of entities for display on the client computing device 306.

The general purpose search engine 302 may further comprise an advertisement selector component 312 that can select an advertisement to display to the user on the client computing device 306 together with the ranked list of entities for the specified domain. For example, an entity in the ranked list of entities may correspond to a manufacturer or retailer that sells the entity or a product related to the entity, and the advertiser may wish to advertise to those searching for entities in the particular domain. For instance, if the domain is "actors" and the ranked list of entities returned by the ranker component 114 has a particular actor as the "best" actor, an advertiser may wish to advertise a movie that stars the actor. The advertisement selector component 312 can cause the advertisement to be displayed to the user on the client computing device 306 together with the ranked list of entities.

The general purpose search engine 302 may also include a feedback component 314 that provides the user of the client computing device 306 with a graphical user interface that allows the user to modify the ranked list of entities belonging to the domain. For instance, the ranker component 114 can output a ranked list of entities for the domain, and the user may slightly disagree with such ranked list. The user may wish that the entity ranked first by the ranker component 114 be ranked third, while the entity ranked second by the ranker component 114 be ranked first. The user of the client computing device 306 can modify placement of the entities in the ranked list of entities to reflect the preferences of the user. This modification can be provided to the learning component 112 (not shown), which can utilize the updated preferences to further train the ranker component 114. Therefore, the ranker component 114 can be personalized for the user and can output updated ranked lists of entities as additional entities pertaining to the domain are added or removed over time (e.g., an actor emerges, a professor retires, etc.).

Figure 4:
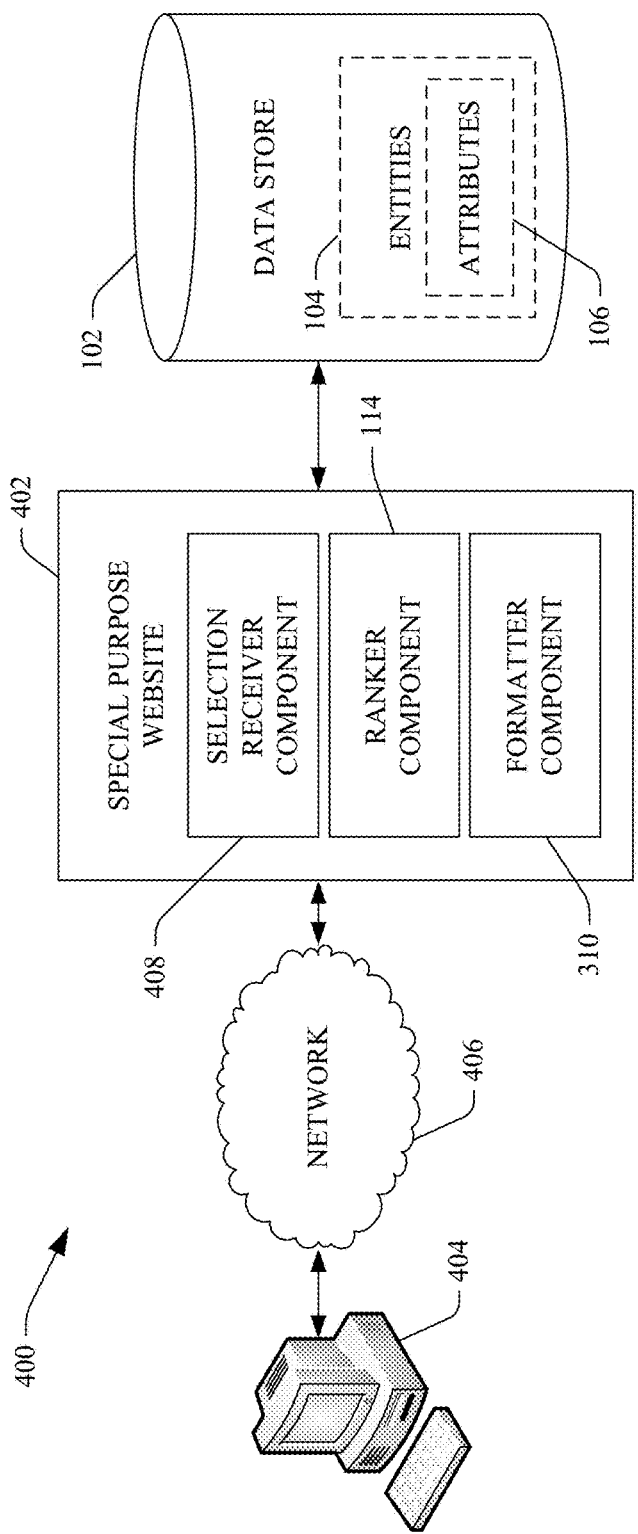
FIG. 4 is a functional block diagram of an example system that facilitates outputting a ranked list of entities that belong to a particular domain upon receipt of a request from a user for such ranked list.

With reference now to FIG. 4, an example system 400 that facilitates outputting a domain-specific ranked list of entities is illustrated. The system 400 includes a special purpose web site 402 that can be accessible to a client computing device 404 by way of a network 406. The special purpose web site 402 can be hosted by a web server that is accessible through utilization of an Internet browser on the client computing device 404. The Internet browser can load the special purpose web site 402, and the user can select a particular domain from amongst a plurality of listed domains displayed on the special purpose web site 402. For instance, the special purpose web site 402 may be a retail web site that is designed to sell electronic devices. The electronic devices may include digital cameras, video cameras, laptop computers, computers, etc., each of which can be a domain. The user can select one of the predefined domains, and a selection receiver component 408 on the special purpose web site 402 can receive such selection.

The special purpose web site 402 may also comprise the ranker component 114 that receives the indication from the selection receiver component 408 that the user has selected the domain that corresponds to the ranker component 114. The ranker component 114 may access that data store 102 and receive the entities 104 that belong to such domain and the corresponding attributes 106. For instance, the data store 102 may reside on the web server together with the special purpose web site 402. The ranker component 114 may then output a ranked list of the entities 104 for presentation to the user of the client computing device 404. The special purpose web site 402 may further comprise the formatter component 310 that is configured to format the ranked list of entities for display on the client computing device 404. Again, the formatter component 310 can take into consideration the type of client computing device when formatting the ranked list of entities for display thereon to the user.

Figure 5:
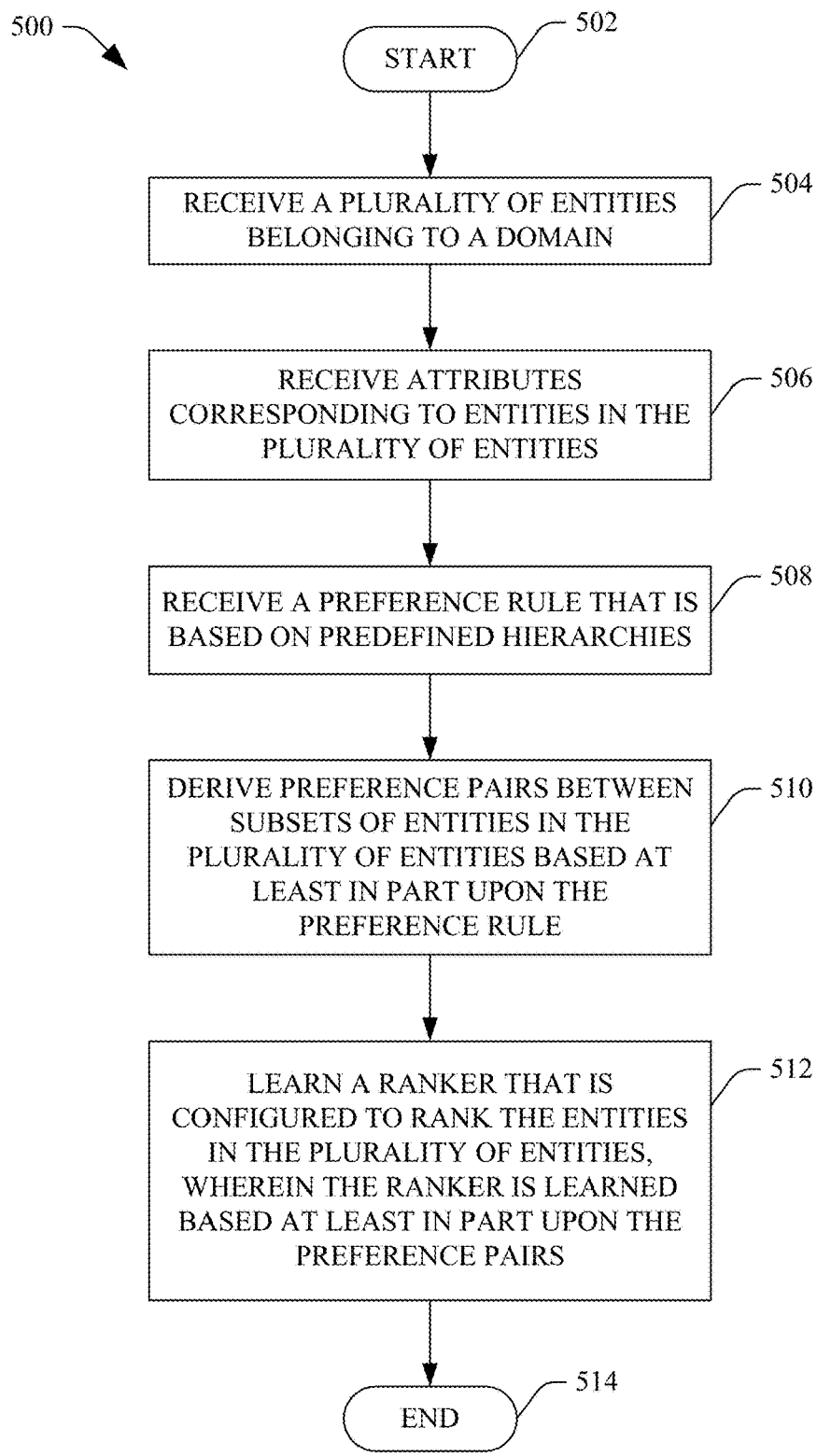
FIG. 5 is a flow diagram that illustrates an example methodology for learning a domain-specific ranker.
Figure 6:
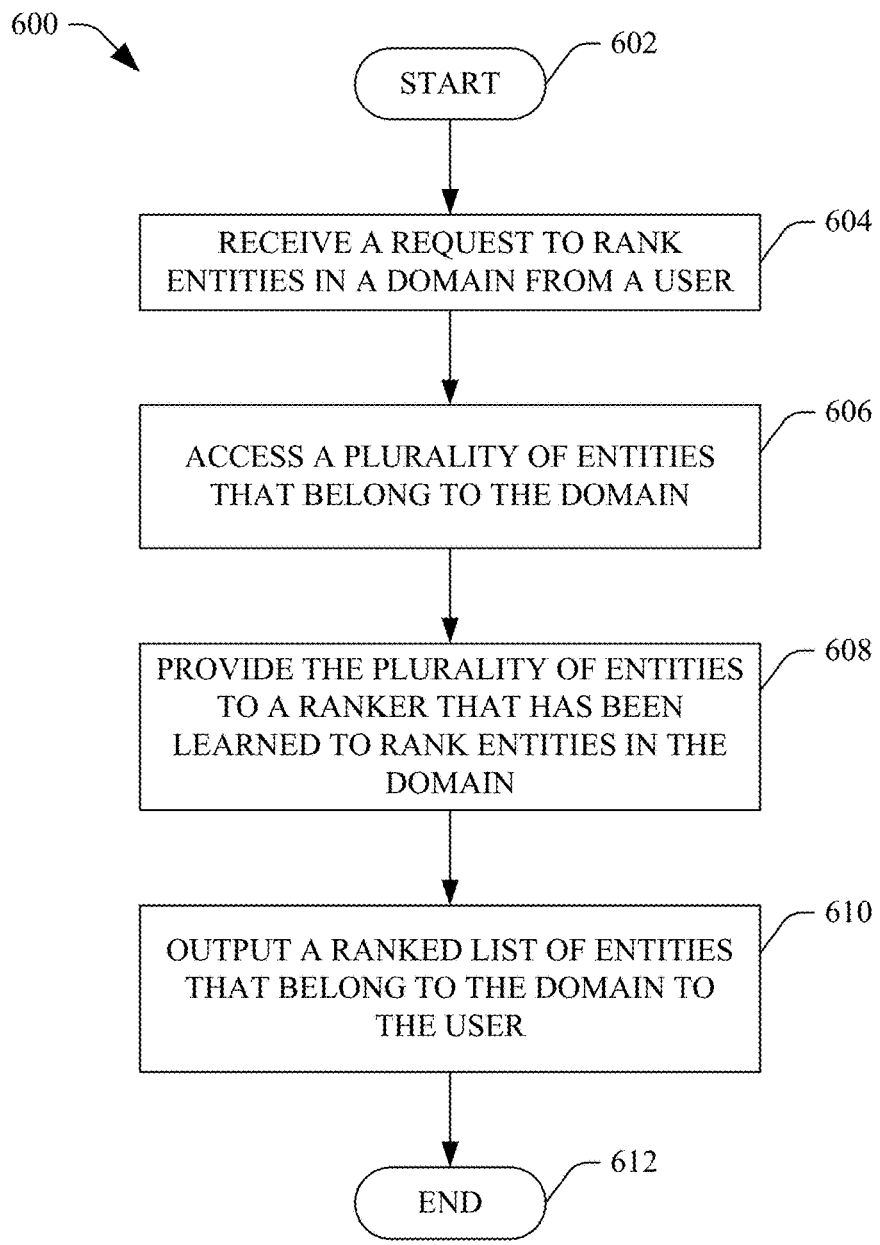
FIG. 6 is a flow diagram that illustrates an example methodology for outputting a ranked list of entities that belong to a particular domain to a user that requests such ranked list.

With reference now to FIGS. 5 and 6, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances not all acts may be required to implement a methodology described herein.

Moreover, the acts described herein may be computer executable instructions that can be implemented by one or more processors and/or stored in a computer readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be a non-transitory medium, such as memory, hard drive, CD, DVD, flash drive, or the like.

Referring now solely to FIG. 5, a methodology 500 that facilitates learning a domain-specific ranker to rank entities that belong to such domain is illustrated. The methodology 500 begins at 502, and at 504 a plurality of entities belonging to a domain are received. For example, these entities may be in computer readable form, such as in the form of a computer readable identifier. At 506, attributes corresponding to entities in the plurality of entities are received. Such attributes can be in the form of a feature vector for each entity.

At 508, at least one preference rule that is based on a predefined hierarchy is received. Such predefined hierarchy may be generally well known, understood, and accepted by people.

At 510, preference pairs between subsets of entities in the plurality of entities are derived based at least in part upon the at least one preference rule.

At 512, a computer implemented ranker is learned that is configured to rank the entities in the plurality of entities, wherein the computer implemented ranker is learned based at least in part upon the preference pairs derived at 510. As indicated above, any suitable ranking function that can learn a ranker upon receipt of preference pairs can be utilized in connection with learning the computer implemented ranker. The methodology 500 completes at 514.

Now referring to FIG. 6, an example methodology 600 for outputting a ranked list of entities that belong to a particular domain to a user is illustrated. The methodology 600 starts at 602, and at 604 a request to rank entities in a particular domain is received from a user. This request can be in the form of a query, in the form of a selection of a graphical icon that represents a particular domain, etc.

At 606, a plurality of entities that belong to the domain are accessed in a data repository. As indicated above, these entities may be represented by feature vectors. At 608, the plurality of entities, including the feature vectors that represent the entities, are provided to a computer-implemented ranker, wherein the computer-implemented ranker is a learned ranker that is configured to rank entities in the particular domain. As described above, the computer implemented ranker is learned based at least in part upon application of a preference rule to a plurality of entities that belong to the domain.

At 610, a ranked list of entities that belong to the domain is output to the user, and can be displayed to the user on a display screen of the computing device employed by such user. The methodology 600 then completes at 612.

Figure 7:
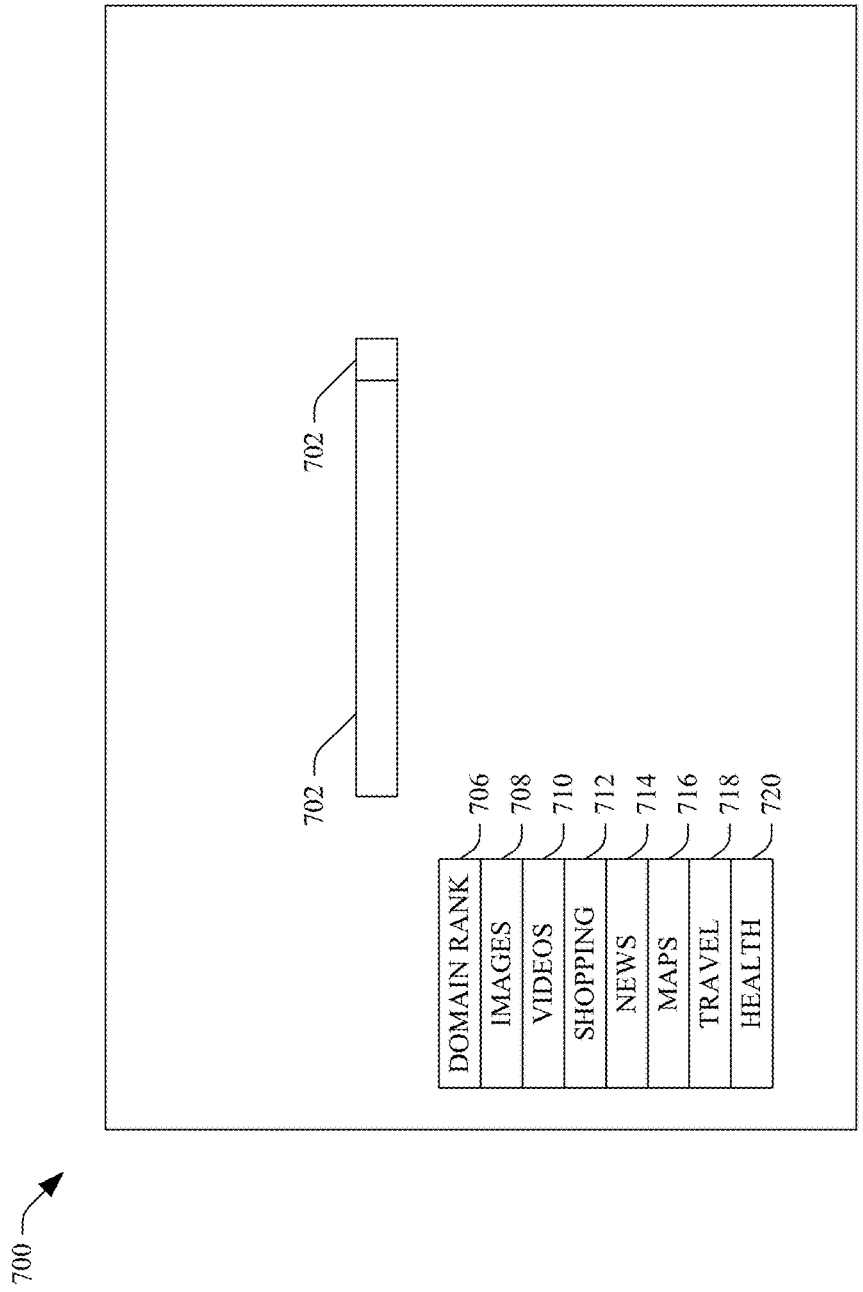
FIGS. 7, 8, and 9 are example graphical user interfaces.
Figure 8:
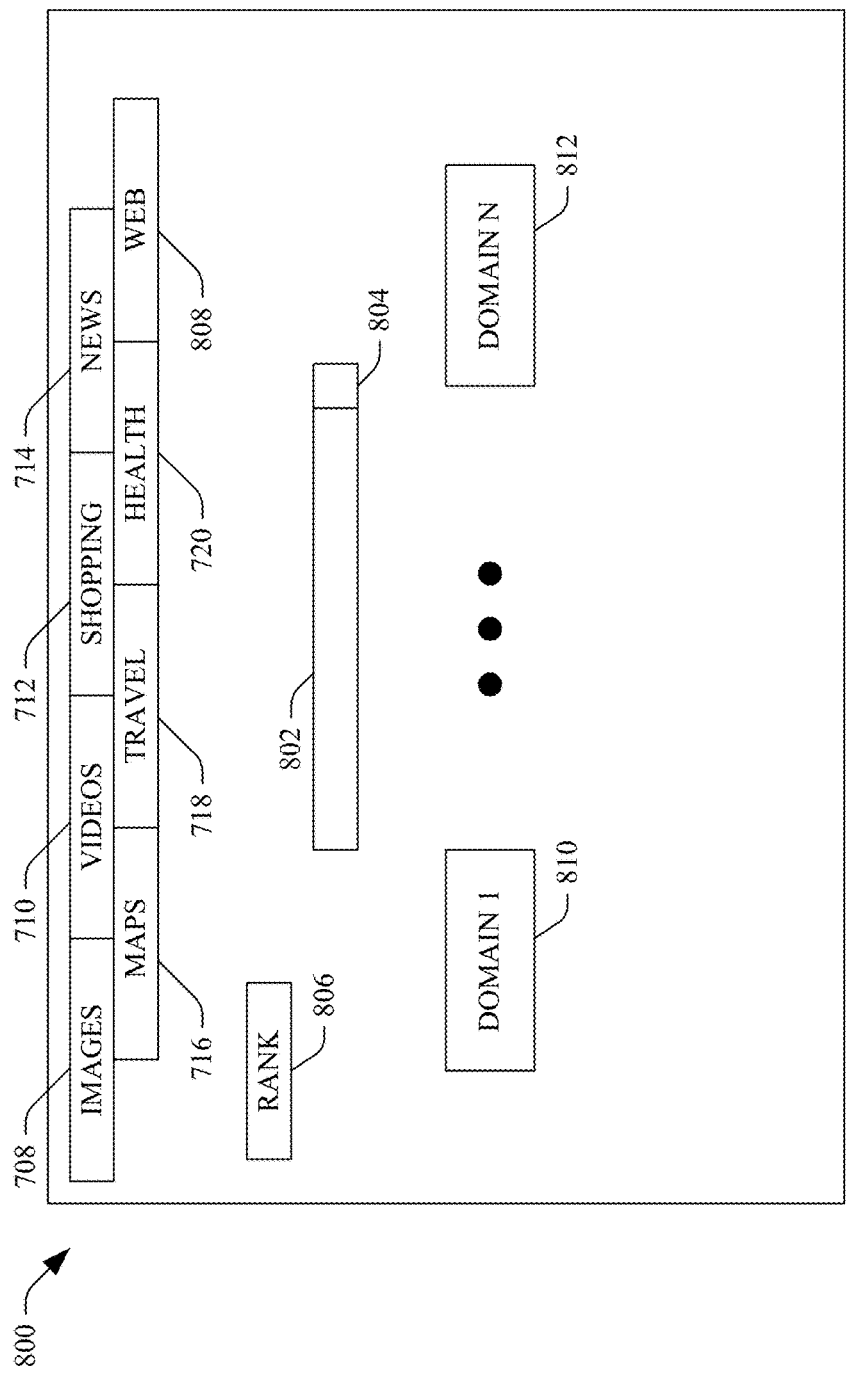
Figure 9:
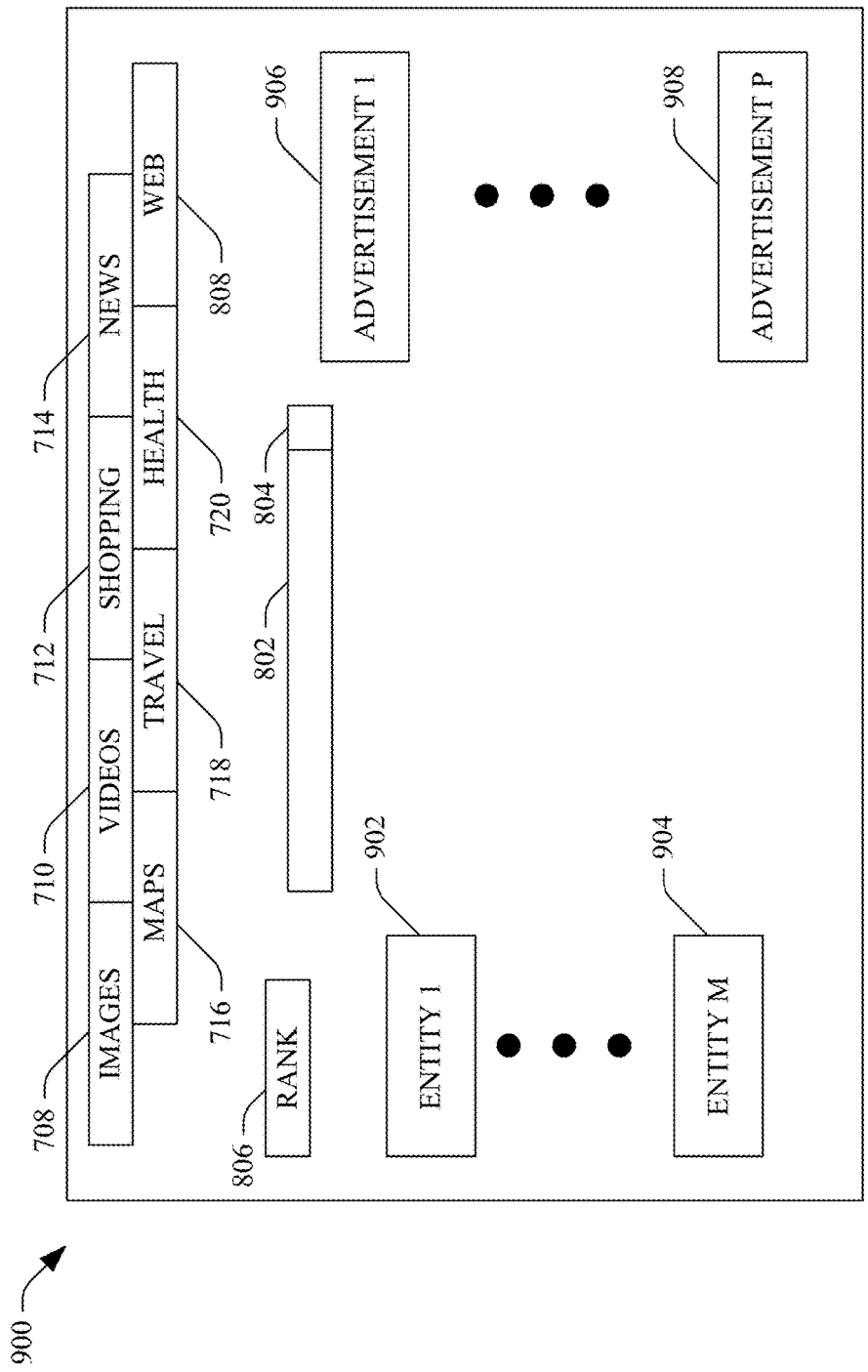

Referring now to FIGS. 7-9, various example graphical user interfaces pertaining to a general purpose search engine that is configured to output ranked lists of entities pertaining to specified domains is illustrated. Referring specifically to FIG. 7, a graphical user interface 700 depicting a front page of a general purpose search engine is illustrated. The front page comprises a query field 702 that is configured to receive a user query, wherein a user issuing a query wishes to search the web for content related to the query. The front page may also include a selectable button 704 that causes the search engine to initiate a search utilizing the query entered into the query field 702.

The front page may also comprise a plurality of graphical icons/hyperlinks 706-720 that can be selected by the user to assist the user in further refining a search. For example, the front page may include a first graphical icon 706 that indicates to the search engine that the user wishes to receive or obtain a ranked list of entities pertaining to a certain specified domain. Thus, upon selecting the graphical icon 706, the user can cause the search engine to allow the user to access certain domain-specific rankers, such that a query can be submitted to a domain-specific ranker. The front page can also include numerous other graphical icons 708-720. Such graphical icons 708-720 can pertain to images, videos, shopping, news, maps, travel, and health, respectively. Of course, other graphical icons pertaining to the user's ability cause the search engine to narrow a search or search for certain types of items are contemplated and are intended to fall under the scope of the hereto-appended claims. What is to be highlighted here is that the front page includes a selectable graphical icon 706 that allows the user to indicate to the general purpose search engine that the user wishes to obtain a ranked list of entities that belong to a domain to be specified by the user.

Referring now to FIG. 8, an example graphical user interface 800 pertaining to a certain portion of a general purpose search engine that can be utilized to obtain a ranked list of entities belonging to a domain specified by a user is illustrated. The graphical user interface 800 includes a query field 802 that can be utilized to receive a query of a user. This query entered into the query field can pertain to a particular domain, wherein a plurality of entities belong to such domain. A button corresponding to the query field 802 can be depressed by the user when the user wishes to cause the search engine to locate a domain pertaining to the query entered in the query field 802.

The graphical user interface 800 further includes a graphical icon 806 that informs the user that the user is currently in a portion of the general purpose search engine that can be utilized to provide ranked lists of entities in a domain specified by the user. The graphical user interface 800 also includes the selectable graphical icons/hyperlinks 708-720, wherein a user can inform the general purpose search engine that such user wishes to search for other types of items by selecting one of the graphical icons/hyperlinks 708-720. The graphical user interface 800 also comprises another selectable icon/hyperlink 808 that causes the search engine to return to the front page, such that the user can utilize the search engine to search for web results.

In addition to selecting domains by way of entering a query into the query field 802, the graphical user interface 800 may comprise graphical icons/hyperlinks 810-812 that are representative of particular domains. For example, the domain represented by the graphical icon/hyperlink 810 may be "actors", and the domain represented by the graphical icon/hyperlink 812 may be "singers". The user can indicate to the search engine a domain of interest by selecting one of the graphical icons/hyperlinks 810-812. Upon selecting a particular domain, either through utilization of the query field 802 and/or selection of a graphical icon/hyperlink 810-812, the search engine can be configured to output a ranked list of entities that belong to the domain selected by the user.

Referring now to FIG. 9, an example graphical user interface 900 that can display a ranked list of entities belonging to a domain to a user is illustrated. The graphical user interface 900 can be presented to the user upon the user selecting a particular domain, as described above. The graphical user interface 900 comprises a plurality of graphical items 902-904 that are representative of entities belonging to the selected domain, wherein the graphical items 902-904 are arranged in a list-type manner, such that the user can quickly ascertain an order in which the entities belonging to the domain are ranked. Pursuant to an example, the graphical items 902-904 may be selectable such that the user is directed to a web page corresponding to the entity if a certain graphical item is selected.

The graphical user interface 900 can also comprise a plurality of advertisements 906-908 that can correspond to the domain selected by the user. For instance, if the user selected the domain of "actors", the advertisements 906-908 can be advertisements for movie rental businesses or retail stores that sell films in which the actors appear. Additionally, the graphical user interface 900 can comprise the selectable graphical icon/hyperlinks 708-720 and 808 such that the user can be directed to different portions of the general purpose search engine. It is to be understood that the graphical user interfaces 700, 800 and 900 have been provided to give a general overview of an arrangement/items that may be included in a general purpose search engine that supports providing ranked lists of entities that belong to a certain domain. It is to be understood that various modifications can be made to these graphical user interfaces, and such modifications are intended to fall under the scope of the hereto-appended claims.

Figure 10:
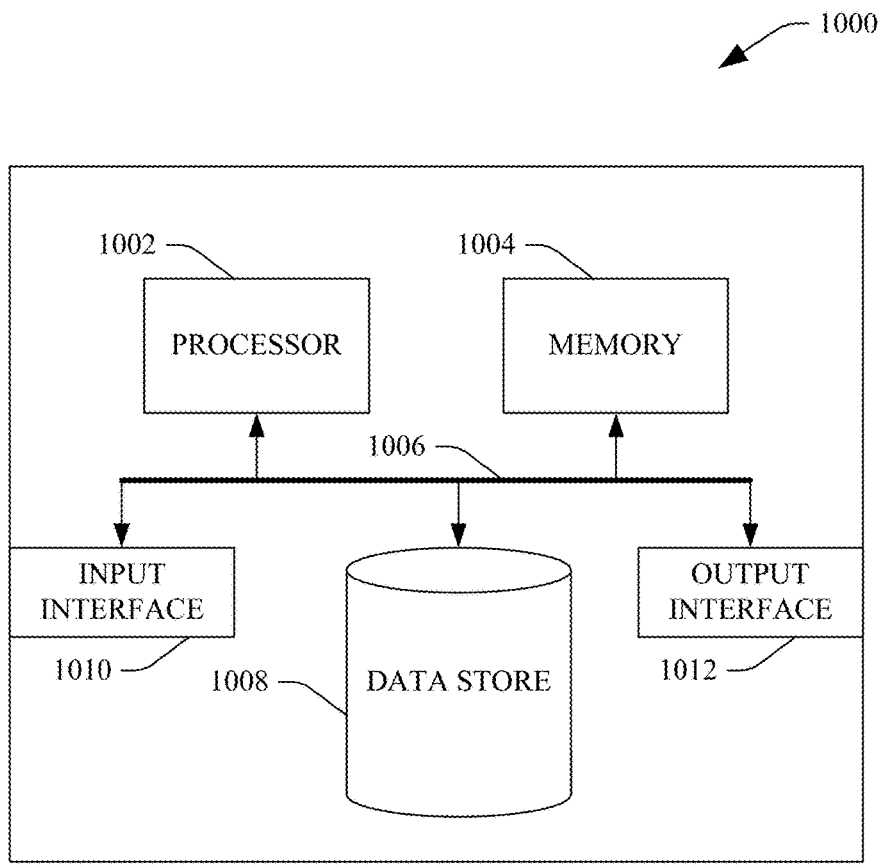
FIG. 10 is an example computing system.

Now referring to FIG. 10, a high-level illustration of an example computing device 1000 that can be used in accordance with the systems and methodologies disclosed herein is illustrated. For instance, the computing device 1000 may be used in a system that supports learning a domain-specific ranker. In another example, at least a portion of the computing device 1000 may be used in a system that supports outputting a ranked list of entities that belong to a particular domain. The computing device 1000 includes at least one processor 1002 that executes instructions that are stored in a memory 1004. The memory 1004 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store a list of entities, feature vectors that represent entities, a ranked list of entities, user feedback information, etc.

The computing device 1000 additionally includes a data store 1008 that is accessible by the processor 1002 by way of the system bus 1006. The data store 1008 may be or include any suitable computer-readable storage, including a hard disk, memory, etc. The data store 1008 may include executable instructions, a list of entities, a list of domains, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012.

Additionally, while illustrated as a single system, it is to be understood that the computing device 1000 may be a distributed system. Thus, for instance, several devices may be in communication by way of a network connection and may collectively perform tasks described as being performed by the computing device 1000.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Furthermore, a component or system may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method executed by at least one processor of at least one computing device, the method comprising:
    receiving, at a computer, a plurality of computer-readable entities that each belong to a domain, wherein each computer-readable entity in the plurality of computer-readable entities represents an entity referenced in a computer-readable document, each computer-readable entity comprises:
        an identifier for the computer-readable entity; and
        a feature vector that describes the entity represented by the computer-readable entity, the feature vector has a plurality of values therein, the plurality of values respectively corresponds to a plurality of attributes of the entity;
    applying a preference rule over pairs of computer-readable entities from amongst the plurality of computer-readable entities to generate preference pairs, each preference pair identifies which computer-readable entity in a pair of computer-readable entities in the preference pair is preferable over the other computer-readable entity in the pair of computer-readable entities, the preference rule comprising a defined preference between a first value of a first attribute in the plurality of attributes and a second value of the first attribute in the plurality of attributes; and
    learning a computer-implemented ranker that is specific to the domain based upon the preference pairs, wherein the computer-implemented ranker, subsequent to being learned, is configured to output a ranked list of entities in the domain in response to receipt of a query, wherein the acts of receiving, applying, and learning are performed by the at least one processor.

2. The method of claim 1, further comprising configuring the ranker for utilization in a general purpose search engine.

3. The method of claim 1, further comprising:
    obtaining the plurality of computer-readable entities, wherein obtaining the plurality of computer-readable entities comprises:
        executing a web crawler over web pages, the web crawler configured to search for references to entities that belong to the domain in the web pages; and
        receiving the plurality of web pages from the web crawler.

4. The method of claim 3, the web crawler further configured to extract the values corresponding to the plurality of attributes from the web pages.

5. The method of claim 1, further comprising:
    receiving the query from a user;
    ranking the plurality of entities utilizing the computer-implemented ranker to generate the ranked list of entities in response to receipt of the query; and
    causing the ranked list of entities to be displayed to the user on a display screen of a computing device.

6. The method of claim 5, further comprising:
    causing an advertisement to be displayed in connection with the ranked list of entities.

7. The method of claim 1, further comprising:
    receiving, from a user, preference data for at least two entities that belong to the domain, the preference data identifies an order of preference of the user for the at least two entities; and
    learning the computer-implemented ranker based upon the preference data.

8. The method of claim 7, wherein the computer-implemented ranker is learned as a personalized ranker for the user.

9. The method of claim 1, further comprising:
    receiving a first ranked list, the first ranked list comprises a first set of entities that belong to the domain, the first set of entities in the first ranked list arranged in a first order;
    receiving a second ranked list, the second ranked list comprises a second set of entities that belong to the domain, the second set of entities in the second ranked list arranged in a second order;
    comparing the first ranked list with the second ranked list to determine an amount of agreement between the first ranked list and the second ranked list;

assigning a first weight to the first ranked list and a second weight to the second ranked list based upon the amount of agreement therebetween; and learning the computer-implemented ranker based upon the weights.

10. A system comprising:
at least one processor; and
memory that comprises a plurality of components that are executed by the processor, the plurality of components comprising:
 a preference deriver component that generates a plurality of preference pairs for a domain, each preference pair comprises:
 a pair of computer-readable entities that represent a respective pair of entities referenced in at least one computer-readable document, the pair of entities belong to the domain, each computer-readable entity in the pair of computer-readable entities comprises:
  an identifier that identifies the entity and a feature vector comprising values of attributes of the entity; and
  an indication as to which entity in the pair of entities is preferred over the other entity in the pair of entities,
 the preference deriver component generates the plurality of preference pairs through application of a predefined preference rule over respective pairs of computer-readable entities, the predefined preference rule defines a preference between two potential values of an attribute, the preference rule further includes a condition that defines that the preference between the two potential values of the attribute applies only when each entity in the preference pair has a same value for a second attribute in the attributes; and
 a learning component that learns a computer-implemented ranker component that is specific to the domain, the learning component learns the computer-implemented ranker component based upon the plurality of preference pairs, wherein the computer-implemented ranker component, subsequent to being learned, is configured to rank entities belonging to the domain based upon values of the attributes of the entities.

11. The system of claim 10, wherein the learning component assigns weights to the attributes based upon the preference pairs, the computer-implemented ranker component, subsequent to being learned, is configured to rank the entities based upon the weights assigned to the attributes.

12. The system of claim 10, wherein the learning component receives a user-defined preference pair defined by a user, wherein the learning component learns the computer-implemented ranker component based upon the user-defined preference pair, and wherein the computer-implemented ranker component is personalized for the user.

13. The system of claim 10, wherein the learning component receives a list that includes a ranking of a set of entities in the domain, and wherein the learning component learns the computer-implemented ranker based upon the list.

14. The system of claim 13, wherein the learning component receives a second list that includes a second ranking of a second set of entities in the domain, the learning component assigns a first weight to the first list and a second weight to the second list, the first weight and the second weight are indicative of an amount of agreement between the ranking and the second ranking, and wherein the learning component learns the computer-implemented ranker based upon the first weight and the second weight.

15. The system of claim 10, wherein the computer-implemented ranker is configured for utilization in a general purpose search engine.

16. The system of claim 10, the plurality of components further comprising an acquirer component that search web pages for references to the entities that belong to the domain and extracts the attribute values for the entities from web pages.

17. A computer-readable memory comprising instructions that, when executed by a processor, cause the processor to perform acts comprising:
 receiving a plurality of computer-readable entities, the computer-readable entities represent entities that belong to a domain, the entities referenced in computer-readable web pages, each computer-readable entity comprises:
  an identifier that identifies an entity represented by the computer-readable entity; and
  a feature vector that comprises values for respective attributes of the entity;
 receiving a predefined preference rule, the preference rule defining a preference between values of one of the respective attributes, the preference rule further defining a condition that defines when the preference is to apply, the condition based upon a value of a second attribute in the respective attributes;
 executing the preference rule over pairs of computer-readable entities in the plurality of computer-readable entities to generate preference pairs, wherein each preference pair comprises:
  a pair of computer-readable entities from the plurality of computer-readable entities, the pair of computer-readable entities represents a pair of entities; and
  an indication as to which entity in the pair of entities is preferred over the other; and
 learning a computer-implemented ranker based at least in part upon the preference pairs, the computer-implemented ranker being specific to the domain, the computer-implemented ranker, subsequent being learned, is configured to rank the entities in the domain.

18. The method of claim 1, further comprising:
receiving a user-defined preference pair from a user, the user-defined preference pair comprises:
 a user-selected pair of computer-readable entities that represents a user-selected pair of entities; and
 an indication that a first entity in the user-selected pair of entities is preferred over a second entity in the user-selected pair of entities, wherein the user-defined preference pair conflicts with a first preference pair in the preference pairs generated by way of application of the preference rule, the first preference pair comprises:
  the user-selected pair of entities; and
  an indication that the second entity is preferred over the first entity; and
 replacing the first preference pair in the plurality of preference pairs with the user-defined preference pair.

19. The method of claim 1, wherein learning the computer-implemented ranker that is specific to the domain based upon the preference pairs comprises assigning respective weights to the plurality of attributes based upon the preference pairs.

20. The method of claim 1, wherein the preference rule further comprises a conditional statement that indicates that the defined preference is applied only when each entity represented in the preference pair has a same value for a second attribute in the plurality of attributes.

* * * * *